March 13, 1956 A. A. COOKE ET AL 2,737,879
AIR PRESSURE REGULATOR
Filed Feb. 5, 1953 2 Sheets-Sheet 1

INVENTORS
Alfred A. Cooke
Merton D. Mears
BY
ATTORNEY

March 13, 1956

A. A. COOKE ET AL 2,737,879

AIR PRESSURE REGULATOR

Filed Feb. 5, 1953

INVENTORS
Alfred A. Cooke
Merton D. Mears

BY

ATTORNEY

United States Patent Office 2,737,879
Patented Mar. 13, 1956

2,737,879
AIR PRESSURE REGULATOR

Alfred A. Cooke and Merton D. Mears, Baltimore, Md., assignors to the United States of America as represented by the Secretary of the Army Application February 5, 1953, Serial No. 335,406

8 Claims. (Cl. 98—119)

(Granted under Title 35, U. S. Code (1952), sec. 266)

The invention described herein may be manufactured and used by or for the Government of the United States of America for governmental purposes without the payment to us of any royalty thereon.

The invention relates generally to valves and specifically to air valves of the antibackdraft type.

It is an object of this invention to provide an air regulator which is adapted to maintain a pressure differential between two air spaces, allow a constant flow of air from one space to the other under normal conditions, and prevent a backflow of air under any conditions.

It is another object of this invention to provide a valve for a protective shelter which maintains a pressurized condition within the shelter, and prevents a reverse flow of air from the atmosphere into said shelter regardless of the atmospheric pressure.

It is a further object of this invention to provide an air pressure regulator that is adapted to be utilized between air spaces wherein it is desired to maintain a pressure differential between the spaces, allow a constant flow of air from the space having a greater pressure to the space having a lesser pressure, and prevent any reverse flow of air if the pressure in the low pressure space should for any reason become greater than that in the high space. It is the purpose of this object to provide an air regulator that can be incorporated into a protective system of air locks wherein the opening and closing of the lock doors creates a piston-like pressure wave on the regulator.

It is a specific object of this invention to provide an air regulator that can be incorporated into a protective shelter of the type which is adapted to house and protect human beings, animals and other forms of life from the deleterious effects of biological, chemical and other harmful agents that might be present in the area surrounding the shelter.

These and other objects will become apparent from the following description taken in conjunction with the drawings wherein.

Figure 1:
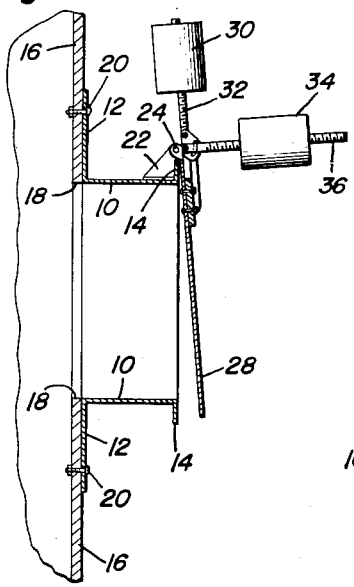
Fig. 1 is a sectional view of one form of valve which incorporates my invention, taken on line 1—1 of Fig. 2.
Figure 2:
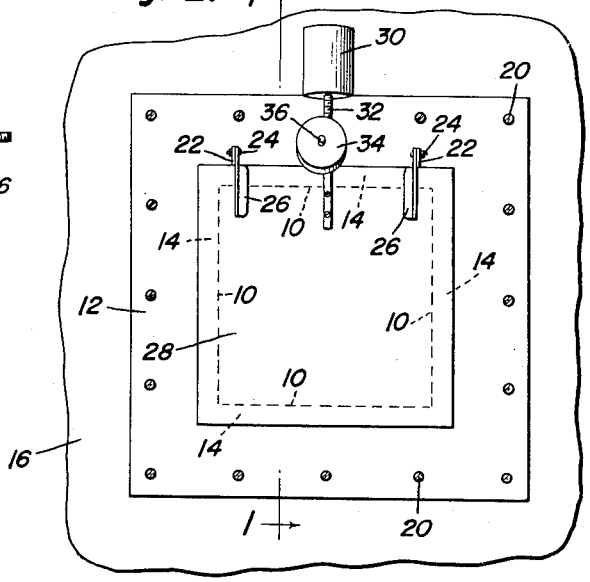
Fig. 2 is a front elevation view of the valve shown in Fig. 1.

Figs. 1 and 2 show one form of our invention. It comprises a hollow valve body 10 which has an apertured mounting flange 12 formed on one side, and flange 14, which constitutes a valve seat, formed on the other side. Valve body 10 is adapted to be secured to wall 16 of a protective structure so that the opening 18 in said wall is in alignment with the opening in valve body 10. Conventional securing means 20 pass through the apertures in mounting flange 12 and appropriate openings (unnumbered) in the wall 16 to secure the valve in its operative position.

A plurality of hinge brackets 22, each having an opening in the upper part thereof, are mounted on the upper side of the upper wall of valve body 10. Each bracket 22 supports a hinge pin 24 in its opening, and said hinge pin passes through an opening in a cooperating hinge bracket 26 which is secured to the valve cover 28 in any conventional manner. The hinge pins 24 form an axis around which the cover 28 pivots. The structure disclosed thus far is conventional and may be considered as the prior art setting for our improvements. It can be briefly described as a suspended cover type, antibackdraft valve, wherein the valve cover is suspended by hinges from its top. The reference characters used thus far are used throughout each of the modifications of our invention to designate the same conventional structure.

Figure 7:
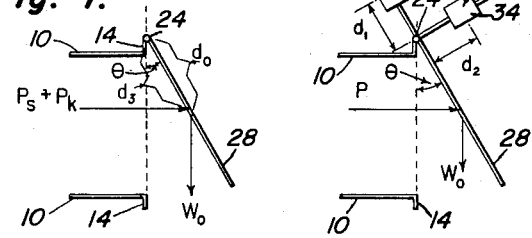
Figs. 7–12 are schematic views which will facilitate the explanation of the mode of operation of and the theory upon which the invention is based.

Fig. 7 schematically shows the forces that act on the valve cover 28 in the absence of any other structure. One of the forces is designated by the arrow $P_s + P_k$, and constitutes the force of the static pressure within the protective structure plus the velocity pressure of the air escaping through the valve. This force tends to rotate the valve cover 28 counterclockwise around pivoting axis formed by hinge pins 24. The other force acting on the valve cover 28 is designated by arrow $W_0$ which is caused by the weight of the cover 28. This force tends to rotate the valve cover clockwise around the pivoting axis formed by hinge pins 24. These forces have components that act normal to the valve cover which produce opposing torques that tend to move the valve cover toward or away from the valve seat 14 of valve body 10 depending upon the magnitude of the torques. In order for the valve cover to satisfy the purposes of this invention, it must be able to reach equilibrium at all angles of opening of the valve cover and at the same time maintain a constant pressure differential (i. e. static pressure $P_s$). To accomplish this, these torques must be equal and opposite at all angles of opening of the valve cover. With the desired conditions, the only torques that move the cover 28 are those caused by a change in the pressure differential on opposite sides of the cover.

The effect of the velocity pressure $P_k$, which is a function of the angle at which the moving air strikes the cover, is comparatively negligible at that the low velocities encountered in the use of a valve of this type and therefore can be ignored. Static pressure $P_s$ is always normal to the cover and its effect is appreciable. The magnitude of the static pressure that is effective on the valve cover is affected by the release of air around the perimeter of the valve cover as the cover opens. This change in effective pressure upon the cover cannot be predicted. Experimentation has established that the effective pressure acting on the cover varies approximately as the cosine of the angle of opening that the valve cover 28 makes with a vertical line that passes through a hinge pin 24 (which angle is herein designated as angle $\theta$). For purposes of computation the pressure $P_s$ may therefore be taken as acting in a horizontal direction and the "effective pressure" as such need not be further considered. The torque produced by the effective pressure on the valve cover is equal to the product of the static pressure, the cosine of the angle $\theta$, the distance from the pivoting axis of the cover to the geometric center thereof, and the area of the cover. The torque produced by the weight of the cover 28 is equal to the product of the weight of the cover, the distance from the pivoting axis to the center of gravity of the cover, and the sine of the angle $\theta$. It will therefore be apparent that as the angle θ varies, the torque created by the static pressure varies as the cosine of angle θ, and the torque created by the weight of the valve cover 28 varies as the sine of angle θ. It will be further apparent that in the absence of additional forces acting on the valve cover, the valve cover 28 will not reach equilibrium for all angles that it might be open to without causing a resulting change in the static pressure, and that it therefore does not satisfy the purposes of the invention.

We have invented several arrangements for insuring that the objects of the invention are achieved. The modification shown in Figs. 1 and 2 utilizes two counterweights which are adjustably mounted on threaded, elongated supports. Support 32 is secured to cover 28, disposed in substantially the same plane as said cover, and extends in the opposite direction thereto. The counterweight 30 is selected of such weight and positioned on support 32 at such a distance from the pivoting axis of the cover, that the torque that it creates will always be equal and opposite to the torque that is created by the weight of cover 28. Inspection of the schematic view shown in Fig. 8 will confirm that the torque created by the weight of cover 28 is always equal and opposite to the torque created by the weight 30 because both are a function of the sine of the angle θ. Therefore, by selecting a counterweight 30 and positioning it at a distance from the pivoting axis of the cover so that the product of the weight and distance is equal to the product of the weight of the cover 28 and the distance of its center of gravity from the pivoting axis, the torques created will always be equal and opposite.

Having compensated from the torque which is created by the weight of cover 28, in order that the valve cover reach equilibrium at all angles θ, another counterweight 34 is positioned on a support 36 so that the torque which it creates is always equal and opposite to the torque created by the static pressure which is desired in the shelter. To accomplish this, the support 36 is secured and disposed perpendicular to cover 28 as shown in Fig. 1. When counterweight 34 is mounted on support 36, the torque which it produces is a function of the cosine of the angle θ, which is precisely what the torque created by the static pressure is a function of.

The relationship of the forces acting on the valve cover 28 can be expressed mathematically by the formula: $P_s$ cosine $\theta d_3 A + W_1 d_1$ sine $\theta = W_0 d_0$ sine $\theta + W_2 d_2$ cosine $\theta$, where $P_s$ equals the static pressure, $\theta$ equals the angle the valve cover makes with a vertical line that passes through the pivoting axis, $d_3$ equals the distance from the pivoting axis to the geometric center of the cover, A equals the area of the valve cover, $W_1$ equals the weight of counterweight 30, $d_1$ equals the distance from the counterweight 30 to the pivoting axis, $W_0$ equals the weight of cover 28, $d_0$ equals the distance from the pivoting axis to the center of gravity of the cover 28, $W_2$ equals the weight of the counterweight 34, and $d_2$ equals the distance from the pivoting axis to the counterweight 34. It will be apparent that when the pressure in the shelter is the desired pressure, the torques created by the forces acting on the valve cover 28 will always be equal and opposite regardless of the angle to which the valve cover is opened. Therefore, with the following given values: the size and weight of the valve cover 28, and the pressure which is desired within the shelter, counterweights 30 and 34 may be selected of such weight and positioned on their respective supports at such a distance from the pivoting axis that they will neutralize the torques created by the weight of cover 28 and the desired shelter pressure, respectively, at all angles of opening. Therefore, the cover will be moved only by torques caused by variations in pressure on either side of the cover.

Transferring terms in the equation given above we obtain $W_2 d_2 \cos \theta - W_1 d_1 \sin \theta = P_s \cos \theta\, d_3 A - W_0 d_0 \sin \theta$. The left hand side of this equation, it will be noted, is the resultant torque produced by weights $W_1$ and $W_2$, tending to close the cover against the pressure of the air.

Hence, the general condition that exists in the various species of our invention may be expressed as follows:

$$T = P_s \cos \theta d_3 A - W_0 d_0 \sin \theta$$

where T is the torque, tending to close the cover, produced by the weight system.

Assuming the following practical set of conditions, the modification shown in Figs. 1 and 2 operates in the following manner: the wall 16 is part of a closed shelter that includes means for supplying purified air into the shelter at any desired, reasonable rate; let us arbitrarily assume that we desire a pressure within the shelter of 14.8 lbs. per square inch and that the normal anticipated pressure on the exterior in the vicinity of the shelter is 14.7 lbs. per square inch. Since it is desired that there be a constant flow of air from within the shelter out through the valve into the atmosphere, the valve cover 28 must be open. This feature is desirable in that it prevents any harmful material present on the outside of the valve from entering the shelter for it will be blown away by the air stream. Having positioned the counterweight 30 on support 32 so that the torque which it creates is always equal to the torque created by the particular cover 28, all that is necessary to do is adjust the counterweight 34 on the support 36 so that the torque which it creates is equal to the torque created by the pressure differential acting on the cover 28, which in this case is .1 lb. per square inch. If we furnish air into the shelter to compensate for that which escapes past the valve cover 28, we will achieve optimum, equilibrium conditions wherein the desired pressurized condition is maintained in the shelter and a constant flow of air passes out the valve.

Assume that the pressure differential diminishes below .1 lb. per square inch (due to a loss of pressure in the shelter or a pressure wave developing on the outside of the shelter), the torque created by the counterweight 34 will exceed that created by the pressure within the shelter; therefore the valve cover 28 will close. This feature prevents any back flow of air through the valve. With the valve closed, the pressure within the chamber builds up until it exceeds that on the outside of the valve cover by .1 lb. per square inch, at which time the valve cover opens and permits a normal flow of air from within the shelter, through the valve to the outside. Alternatively, let us assume that instead of a decrease in the pressure differential, there is an increase (due to a pressure build up in the shelter or a pressure drop outside). This has the relative effect of increasing the pressure on the inside of the valve cover and therefore causes the torque created by the shelter pressure to exceed that created by the counterweight 34, and causes the valve cover 28 to open. As the valve opens, a larger amount of air escapes past the valve cover 28 causing the pressure within the shelter to drop; when the pressure within the shelter reaches a point at which it is greater than the outside pressure by .1 lb. per square inch, the valve will reach equilibrium conditions. If the pressure within the shelter continues to drop and the pressure differential becomes less than .1 lb. per square inch, the torque created by the counterweight 34 will exceed that created by the shelter pressure, and the valve will start to close in the absence of other structure, such as means for automatically increasing or decreasing the supply of air into the shelter.

It will be seen that this arrangement provides for equilibrium conditions to obtain regardless of the angle that the valve cover is open to when the desired pressure differential is reached. Further, this arrangement always operates to seek optimum equilibrium conditions, that is, equilibrium at the desired shelter pressure established by the setting of the counterweight 34.

Figure 3:
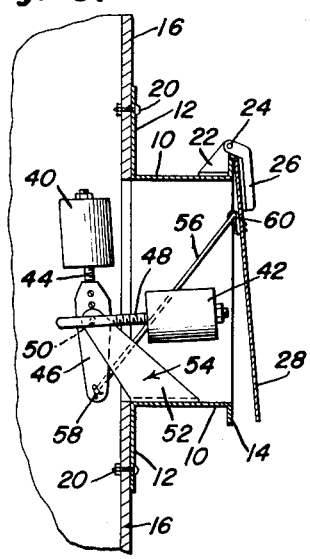
Fig. 3 is a sectional view of another form of valve which incorporates my invention, taken on line 3—3 of Fig. 4.
Figure 4:
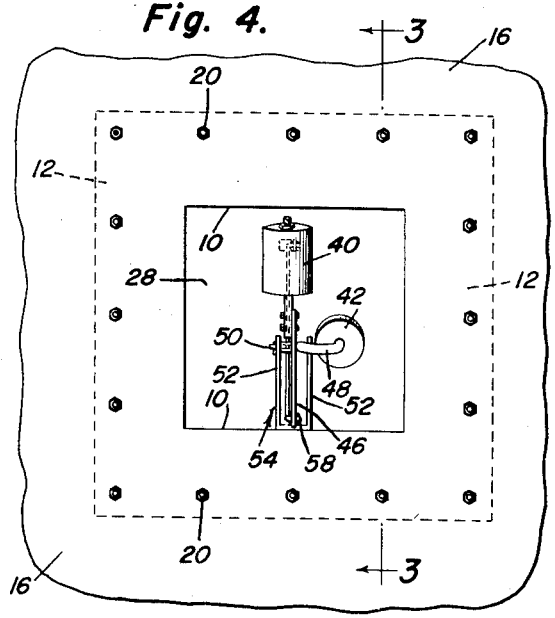
Fig. 4 is a rear elevation view of the valve shown in Fig. 3.

The modification shown in Figs. 3 and 4 operates on the same principles as the modification shown in Figs. 1 and 2. The only difference is that the counterweights 40 and 42, which correspond respectively to counterweights 30 and 34 of the first modification, are positioned on the inside of the shelter. The reason for this is that in this position the counterweights and their associated structure are accessible for adjustment from within the shelter, are free from tampering from without the shelter, are free from external blasts, and are free from the elements which would corrode them. In Fig. 3 it will be seen that counterweight 40 is adjustably mounted on an elongated, threaded support 44 which is disposed in a plane that is parallel to the plane in which valve cover 28 is disposed, and that it is connected to plate 46. Counterweight 42 is adjustably mounted on an elongated, threaded support 48 which is perpendicular to the support 44 and also secured to plate 46. Plate 46 is pivotably mounted on pin 50, the ends of which are secured in the upwardly extending ears 52 of bifurcated bracket 54. Linkage rod 56 is connected to the lower portion of plate 46 at point 58 and to the inner side of cover 28 at point 60. The modification of Figs. 3 and 4 is shown schematically in Fig. 9 wherein it can be proved that the effect of counterweights 40 and 42 is the same as it would be if they were positioned on the outside of valve cover in the same manner as the counterweights 30 and 34 are positioned in the first modification. This will be apparent when it is noted that the linkage 56 is connected to the cover 28 in such a manner that the figure made by connecting points 24, 50, 58 and 60 is a parallelogram. With this arrangement, the counterweights are more conveniently located for practical purposes, while the effect of the counterweights remains unchanged.

Figure 5:
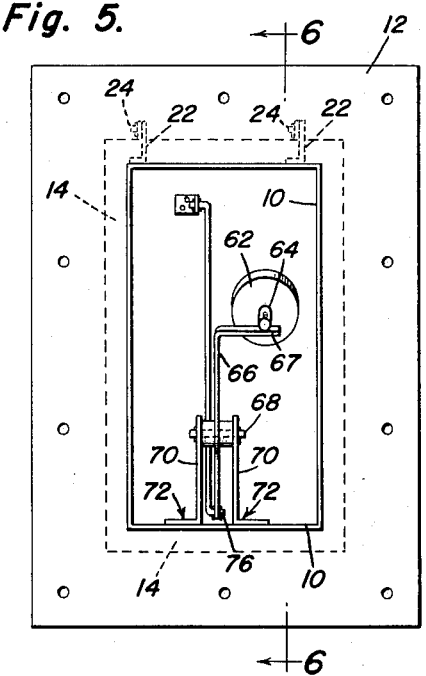
Fig. 5 is a rear elevation view of another form of valve which incorporates my invention.
Figure 6:
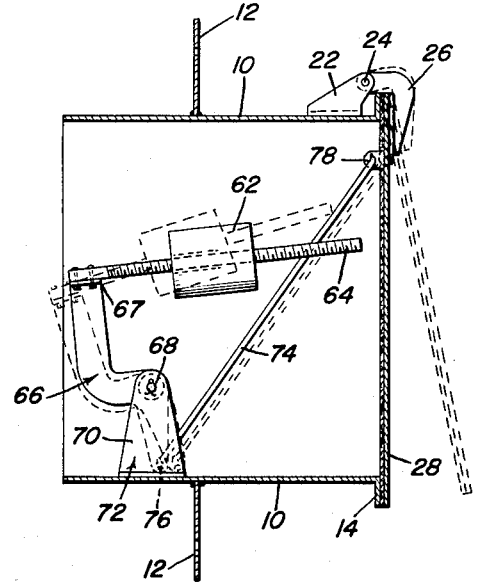
Fig. 6 is a sectional view taken on line 6—6 of Fig. 5.

The modification shown in Figs. 5 and 6 functions in the same general manner and achieves the same desirable results of the first two modifications, but utilizes only a single counterweight. The single counterweight 62 is adjustably mounted on a threaded, elongated support 64, which in turn is secured to arm 67 of irregularly-shaped plate 66. Plate 66 which is herein termed Z-shaped (see Fig. 6) is pivotably mounted on pin 68, the ends of which are secured in the ears 70 of mounting brackets 72. The lower portion of plate 66 is connected to one end of linkage 74 at point 76. The other end of linkage 74 is connected to valve cover 28 at point 78. The dotted view in Fig. 6 shows the position of the parts when the valve is open.

Figure 8:
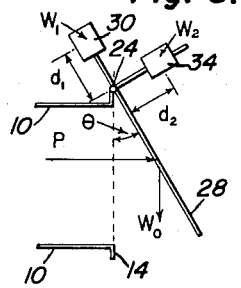
Figure 9:
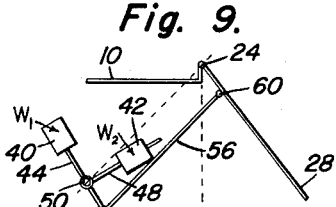
Figure 10:
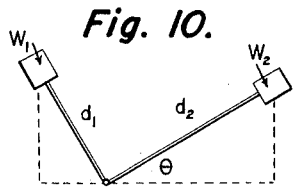
Figure 11:
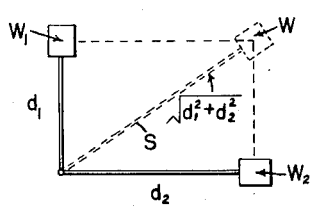

The positioning of single counterweight 62 with respect to the point defined by the axis of pin 68, around which it pivots, is critical, and was determined in the following manner: the functions and values of each of the two counterweights $W_1$ and $W_2$ of Figs. 8 and 9 were analyzed in Fig. 10 where it will be seen that the effects of the counterweights were opposed to each other along the horizontal axis but were cumulative along the vertical axis. To replace the counterweights $W_1$ and $W_2$ by a single counterweight W, it is necessary that $W_1$ be equal to $W_2$, and that the components of $W_1$ and $W_2$ be combined. The position of the single counterweight W along the horizontal axis can be expressed by $X = d_2$ cosine $\theta - d_1$ sine $\theta$. Similarly the position of the counterweight above the horizontal axis can be expressed by $Y = d_2$ sine $\theta + d_1$ cosine $\theta$. Squaring, adding and clearing these two equations result in the equation $X^2 + Y^2 = d_1 + d_2$, which is the equation of a circle. Therefore, a single counterweight W can replace the two counterweights $W_1$ and $W_2$ if it moves in a circle with a radius equal to the square root of $d_1^2 + d_2^2$. Fig. 11 schematically shows the two counterweights $W_1$ and $W_2$ (in solid lines) disposed on supports as in the first two modifications and a single counterweight W (in dotted lines) which replaces the two counterweights (adjustably mounted on support S). A counterweight disposed in the manner shown in Fig. 11 is theoretically correct and will regulate a valve cover for one pressure. However, it does not have the flexibility of operation which will permit the weight W to be adjusted for different, desired, static pressures, for it will be observed that moving the position of the weight W on its support S results in alteration of the value of both $d_1$ and $d_2$, whereas the value of $d_1$ must remain constant to counter-balance the valve cover 28. This shortcoming is eliminated by providing an arrangement which is shown schematically in Fig. 12. It will be observed from this view that the counterweight W is mounted on a leg of a substantially L-shaped support at a point where the distance to the pivot point 68 is equal to the square root of $d_1^2 + d_2^2$, and that adjustment of the weight W on its support will effect the value of $d_2$ but not the value of $d_1$.

Figure 12:
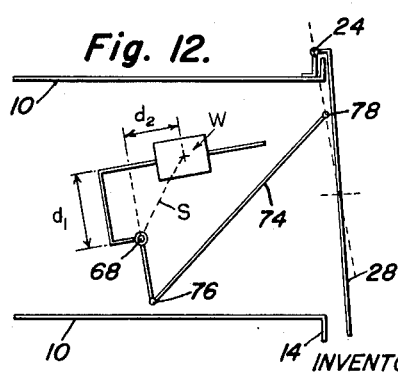

It will be further noted from Fig. 6 and Fig. 12 that the pivoting axis 24 is not located in the plane of the valve cover. The pivoting axis is set back as a safety factor against production and assembly variations which might affect the initial position of the counterweight support. The point 78 is located in a plane that passes through the pivoting axis 24 and the center of gravity of the valve cover, and represents one corner of the parallelogram formed by points 24, 68, 76 and 78. It is therefore apparent that even though the pivoting axis is set back, the parallelogram system of transmitting force is maintained.

Having described our invention in great detail for the purposes of illustration, it is not intended thereby to limit the scope thereof, but it is intended to embrace all changes that might be made by one skilled in the art which fall within the spirit of the invention and the scope of the appended claims.

We claim:

1. In a valve comprising a valve body having an opening bounded by a vertically extending surface, a cover plate pivoted at its top on a pivoting axis and covering said opening, said cover plate lying under the influence substantially solely of fluid pressure tending to move said plate away from a vertical position and gravity tending to move said plate toward said vertical position; the improvement comprising weight means so positioned as to produce at all times, at any position of the cover, under the action of gravity a torque tending to move said cover plate toward said vertical position equal to $$P_s \cos \theta d_3 A - W_0 d_0 \sin \theta$$

where $P_s$ is the static pressure of the fluid, $\theta$ is the angle from the vertical of a line through the axis and the center of gravity of the cover plate, A is the area of the cover plate, $d_3$ is the distance from the hinge to the geometrical center of the cover plate, $d_0$ is the distance from the axis to the center of gravity of the cover, and $W_0$ is the weight of the cover, said weight means comprising a first weight having its center of gravity lying in a plane including said axis and the center of gravity of said plate and on the opposite side of said axis from said center of gravity, and a second weight having its center of gravity positioned in a plane including said axis and perpendicular to said first named plane.

2. In a valve comprising a valve body having an opening bounded by a vertically extending surface, a cover plate pivoted at its top on a pivoting axis and covering said opening, said cover plate lying under the influence substantially solely of fluid pressure tending to move said plate away from a vertical position and gravity tending to move said plate toward said vertical position; the improvement comprising weight means so positioned as to produce at all times, at any position of the cover, under the action of gravity a torque tending to move said cover plate toward said vertical position equal to $$P_s \cos \theta d_3 A - W_0 d_0 \sin \theta$$

where $P_s$ is the static pressure of the fluid, $\theta$ is the angle from the vertical of a line through the axis and the center of gravity of the cover plate, A is the area of the cover plate, $d_3$ is the distance from the hinge to the geometrical center of the cover plate, $d_0$ is the distance from the axis to the center of gravity of the cover, and $W_0$ is the weight of the cover, said weight means comprising a second axis mounted within said valve body and parallel to said first named axis, a frame pivoted on said second axis, a pair of weights mounted on said frame, each of said weights having its center of gravity located in a plane including said second axis, said planes being at right angles to each other, and a connecting link joining said frame to said plate, said frame and connecting link being so constructed and arranged that one of said aforementioned planes is at all times parallel to the plane including said first mentioned axis and the center of gravity of said cover.

3. In a valve comprising a valve body having an opening bounded by a vertically extending surface, a cover plate pivoted at its top on a pivoting axis and covering said opening, said cover plate lying under the influence substantially solely of fluid pressure tending to move said plate away from a vertical position and gravity tending to move said plate toward said vertical position; the improvement comprising weight means so positioned as to produce at all times, at any position of the cover, under the action of gravity a torque tending to move said cover plate toward said vertical position equal to $$P_s \cos \theta d_3 A - W_0 d_0 \sin \theta$$

where $P_s$ is the static pressure of the fluid, $\theta$ is the angle from the vertical of a line through the axis and the center of gravity of the cover plate, A is the area of the cover plate, $d_3$ is the distance from the hinge to the geometrical center of the cover plate, $d_0$ is the distance from the axis to the center of gravity of the cover, and $W_0$ is the height of the cover, said weight means comprising a second axis within said valve body and parallel to said first mentioned axis, a frame pivotally mounted on said second axis, a connecting link joining said frame to said cover plate, supporting means on said frame, a single weight mounted on said supporting means, the center of gravity of said weight being in a plane including said last named axis and making an acute angle to the plane including the first mentioned axis and the center of gravity of said cover plate.

4. A valve as defined in claim 3 wherein said weight is adjustably mounted on said supporting means in such a manner as to be movable in a direction perpendicular to a plane including said first mentioned axis and the center of gravity of said cover plate.

5. In an inclosure comprising walls forming a closed air space, means for supplying air to said closed air space, an outlet for air from said air space and a valve in said outlet adapted to maintain a predetermined superatmospheric pressure in said air space, said valve comprising a valve body having an opening bounded by a vertically extending surface, a cover plate pivoted at its top on a pivoting axis and covering said opening, said cover lying under the influence substantially solely of fluid pressure tending to move said plate away from a vertical position and gravity tending to move said plate toward said vertical position; the improvement comprising weight means so positioned as to produce at all times, at any position of the cover, under the action of gravity a torque tending to move said cover plate toward said vertical position equal to $$P_s \cos \theta d_3 A - W_0 d_0 \sin \theta$$

where $P_s$ is the static pressure of the fluid, $\theta$ is the angle from the vertical of a line through the axis and the center of gravity of the cover plate, A is the area of the cover plate, $d_3$ is the distance from the hinge to the geometrical center of the cover plate, $d_0$ is the distance from the axis to the center of gravity of the cover, and $W_0$ is the weight of the cover, said weight means comprising a first weight having its center of gravity lying in a plane including said axis and the center of gravity of said plate and on the opposite side of said axis from said center of gravity, and a second weight having its center of gravity positioned in a plane including said axis and perpendicular to said first named plane.

6. In an inclosure comprising walls forming a closed air space, means for supplying air to said closed air space, an outlet for air from said air space and a valve in said outlet adapted to maintain a predetermined superatmospheric pressure in said air space, said valve comprising a valve body having an opening bounded by a vertically extending surface, a cover plate pivoted at its top on a pivoting axis and covering said opening, said cover plate lying under the influence substantially solely of fluid pressure tending to move said plate away from a vertical position and gravity tending to move said plate toward vertical position; the improvement comprising weight means so positioned as to produce at all times, at any position of the cover, under the action of gravity a torque tending to move said cover plate toward said vertical position equal to $$P_s \cos \theta d_3 A - W_0 d_0 \sin \theta$$

where $P_s$ is the static pressure of the fluid, $\theta$ is the angle from the vertical of a line through the axis and the center of gravity of the cover plate, A is the area of the cover plate, $d_3$ is the distance from the hinge to the geometrical center of the cover plate, $d_0$ is the distance from the axis to the center of gravity of the cover, and $W_0$ is the weight of the cover, said weight means comprising a second axis mounted within said valve body and parallel to said first named axis, a frame pivoted on said second axis, a pair of weights mounted on said frame, each of said weights having its center of gravity located in a plane including said second axis, said planes being at right angles to each other, and a connecting link joining said frame to said plate, said frame and connecting link being so constructed and arranged that one of said aforementioned planes is at all times parallel to the plane including said first mentioned axis and the center of gravity of said cover plate.

7. In an inclosure comprising walls forming a closed air space, means for supplying air to said closed air space and an outlet for air from said air space and a valve in said outlet adapted to maintain a predetermined superatmospheric pressure in said air space, said valve comprising a valve body having an opening bounded by a vertically extending surface, a cover plate pivoted at its top on a pivoting axis and covering said opening, said cover plate lying under the influence substantially solely of fluid pressure tending to move said plate toward said vertical position; the improvement comprising weight means so positioned as to produce at all times, at any position of the cover, under the action of gravity a torque tending to move said cover plate toward said vertical position equal to $$P_s \cos \theta d_3 A - W_0 d_0 \sin \theta$$

where $P_s$ is the static pressure of the fluid, $\theta$ is the angle from the vertical of a line through the axis and the center of gravity of the cover plate, A is the area of the cover plate, $d_3$ is the distance from the hinge to the geometrical center of the cover plate, $d_0$ is the distance from the axis to the center of gravity of the cover, and $W_0$ is the weight of the cover, said weight means comprising a second axis within said valve body and parallel to said first mentioned axis, a frame pivotally mounted on said second axis, a connecting link joining said frame to said cover plate, supporting means on said frame, a single weight mounted on said supporting means, the center of gravity of said weight being in a plane including said last named axis and making an acute angle to the plane including the first mentioned axis and the center of gravity of said cover plate.

8. A valve as defined in claim 7 wherein said weight is adjustably mounted on said supporting means in such a manner as to be adjustably movable in a direction perpendicular to a plane including said first mentioned axis and the center of gravity of said cover plate.

(References on following page)

References Cited in the file of this patent

UNITED STATES PATENTS

| | | |
|---|---|---|
| 101,972 | Barr | Apr. 19, 1870 |
| 1,508,813 | Miles | Sept. 16, 1924 |
| 1,708,310 | Korngiebel | Apr. 9, 1929 |
| 2,388,253 | Dady | Nov. 6, 1945 |
| 2,579,395 | Pfautsch | Dec. 18, 1951 |
| 2,599,075 | Stroup | June 3, 1952 |

FOREIGN PATENTS

| | | |
|---|---|---|
| 218,170 | Great Britain | July 3, 1924 |
| 313,205 | Italy | Dec. 19, 1933 |